United States Patent [19]
Bonnet et al.

[11] Patent Number: 6,053,721
[45] Date of Patent: Apr. 25, 2000

[54] DOUGH SHAPING MACHINE

[75] Inventors: Daniel Bonnet, Premery; François Garcia, Urzy, both of France

[73] Assignee: Electrolux Baking, Cagnes-sur-Mer, France

[21] Appl. No.: 09/143,340

[22] Filed: Aug. 28, 1998

[30] Foreign Application Priority Data

Aug. 29, 1997 [FR] France .................................. 97 10813

[51] Int. Cl.[7] ....................................................... A21C 3/00
[52] U.S. Cl. ........................... 425/193; 425/337; 425/372
[58] Field of Search .................................. 425/193, 335, 425/337, 363, 364 R, 371, 372

[56] References Cited

U.S. PATENT DOCUMENTS

| Re. 18,545 | 7/1932 | Sternberg ................................ 425/337 |
| 1,895,634 | 1/1933 | Lauterbur et al. ....................... 425/337 |
| 3,368,502 | 2/1968 | Elgner ..................................... 425/337 |
| 4,036,569 | 7/1977 | Oshikiri .................................. 425/337 |
| 4,266,920 | 5/1981 | Hayashi et al. ......................... 425/337 |
| 4,996,915 | 3/1991 | Morikawa et al. ..................... 425/335 |
| 5,538,414 | 7/1996 | Kobayashi et al. .................... 425/335 |

*Primary Examiner*—James P. Mackey
*Attorney, Agent, or Firm*—Wenderoth, Lind & Ponack, L.L.P.

[57] ABSTRACT

This dough shaping machine includes a station (20) for rolling out dough and a station (14, 16) for conveying the rolled out dough along an outward path from the entry of the conveyor station (14, 16) facing the rolling out station (20) to an intermediate point through a station for rolling up the rolled out dough and a return path through a station (44) for shaping the rolled up dough by elongating it from the intermediate point to the exit from the transfer point near the entry. It further includes, near the intermediate point, a station (46) for actively transferring the rolled up dough from the outward path to the return path.

29 Claims, 3 Drawing Sheets

DOUGH SHAPING MACHINE

The present invention concerns a device for shaping dough.

The invention is more particularly concerned with a horizontal dough shaping device comprising, mounted on a frame, a station for rolling out the dough and a station for conveying the rolled out dough along an outward path from the entry of the conveyor station facing the rolling out station to an intermediate point through a station for rolling up the rolled out dough and a return path through a station for stretching the rolled up dough from said intermediate point to the exit from the conveyor station near said entry and where the shaped dough is delivered to the output of the shaping machine.

In the prior art the conveyor station includes a motorized conveyor belt having two active faces, namely a first active face on which the rolled out dough moves along the first outward path and a second active path opposite the first and delimiting the second path.

In horizontal shaping machines, in which the conveyor is disposed horizontally, the lower second active face of the conveyor cooperates with a fixed horizontal plate extending substantially parallel to it and at an appropriate distance to stretch the dough.

Because of their structure, and in particular because of the immobility of the horizontal plate, shaping machines of the above type cannot stretch the dough to a relatively great length.

Shaping machines which partially remedy this drawback are known in themselves.

In such shaping machines the conveyor station comprises two motorized transfer conveyor belts parallel to each other and moving in opposite directions.

The upper face of the first conveyor transfers the dough from the rolling up station to the intermediate point and its lower face cooperates with the upper face of the second conveyor which is driven in the opposite direction at a slower speed for shaping the dough and conveying it to the exit from the shaping machine.

The use of two active surfaces moving in opposite directions enables considerable stretching of the shaped dough. However, because the active face of the second conveyor tends to move the dough in the opposite direction to the exit from the shaping machine, it is necessary for the conveyors to be arranged obliquely so that the dough reaching the intermediate point drops between the first and second conveyors.

This obviously has a number of drawbacks, in particular because of the relatively imprecise positioning of the dough at the shaping station, due to the mode of transfer used, which is likely to cause shaping defects.

The aim of the invention is to overcome this drawback and to provide a dough shaping machine that is capable of delivering dough stretched to a great length and of regular shape centered relative to the exit from the shaping machine.

It therefore consists in a dough shaping machine of the aforementioned type characterized in that it further includes, in the vicinity of the intermediate point, a transfer station with a mobile member actively transferring the rolled up dough from the outward path to the return path.

The dough shaping machine of the invention can further have one or more of the following features:

the conveyor station includes a first motorized transfer conveyor belt with mutually opposed first and second active faces moving in opposite directions and a second motorized conveyor having an active face parallel to the second active face of the first conveyor and moving at a lower speed and in the opposite direction to the latter, said first active face of the first conveyor delimiting said outward path and said second active face of the first conveyor and said active face of the second conveyor conjointly assuring the shaping and the displacement of the rolled up dough along said return path;

the transfer station includes a third motorized conveyor belt downstream of the outward path and including an active surface facing towards the intermediate point and extending towards a gap between said first and second conveyors;

at the intermediate point the active surface of the third conveyor and the facing surface of the first conveyor are at a distance from each other less than or equal to the diameter of the rolled up dough and are moved in opposite directions to rotate the dough and to prevent its ejection;

the third conveyor is mobile in translation on the frame parallel to the second conveyor about a stable equilibrium position for receiving rolled up dough between a retracted position enabling dough to pass beyond the intermediate point under the action of a force exerted by said dough in opposition to return means urging said third conveyor towards the equilibrium position and an advanced position for pushing the dough between first and second conveyors by means of the inertia of said third conveyor;

the third conveyor is equipped with rollers engaging in inclined guides to urge said third conveyor towards the retracted position;

the belt of the third conveyor is made up of a plurality of associated belts extending parallel to the direction of movement of the dough;

the third conveyor is driven at a speed which is at least equal to that of the second conveyor and less than that of the first conveyor;

said first and second conveyors are disposed horizontally and said third conveyor is inclined to them;

said second and third conveyors are fixed to a common mobile box section carried by the frame in an adjustable manner and said first conveyor is mounted on a box-section fixed relative to said frame so that the distance between said first and second conveyors can be adjusted.

Other features and advantages will emerge from the following description given by way of example only and with reference to the accompanying drawings, in which.

Figure 1:
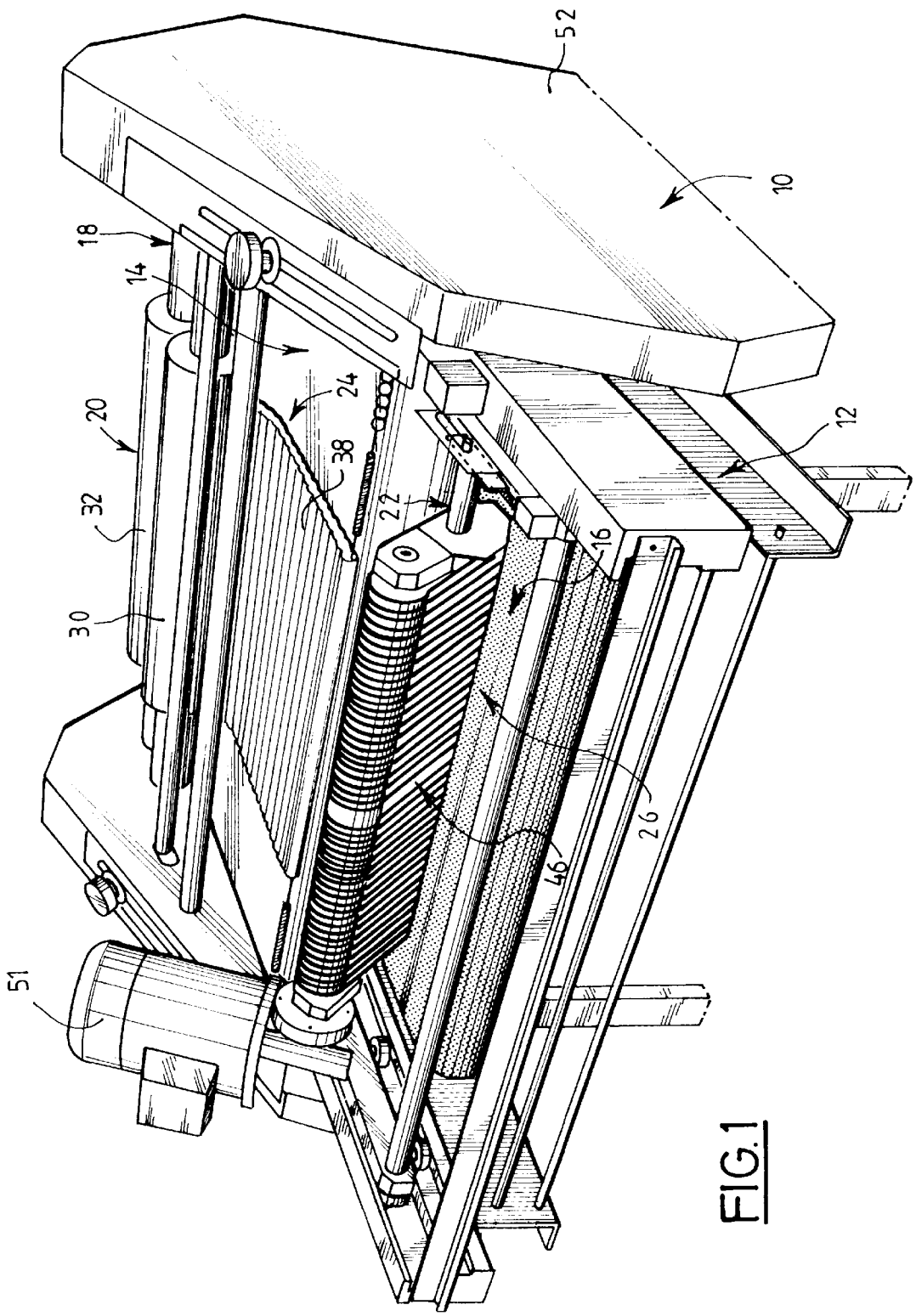
FIG. 1 represents a perspective view of a shaping machine of the invention.
Figure 2:
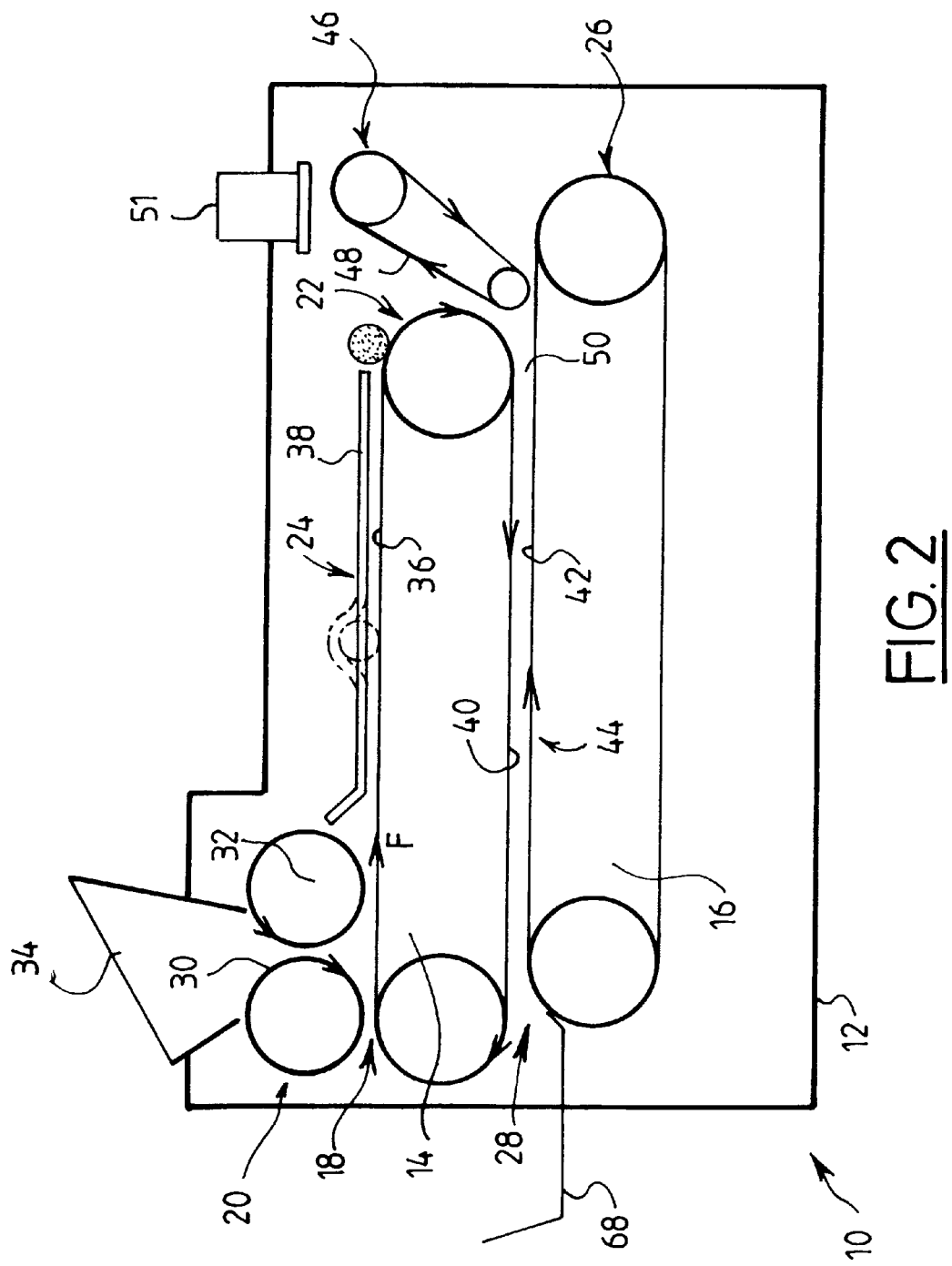
FIG. 2 represents a diagrammatic view in longitudinal section of the shaping machine from FIG. 1.

Referring to FIGS. 1 and 2, the dough shaping machine 10 of the invention includes a frame 12 constructed from metal beams and sections, for example, and on which are mounted, one above the other, two motorized conveyor belts for transporting dough, namely a first conveyor 14 at the top and a second conveyor 16 at the bottom.

The two conveyors 14 and 16 conjointly constitute a station for conveying dough between an entry of the station, consisting of a first end 18 of the top conveyor 14 facing a dough rolling out station 20, and an intermediate point consisting in the opposite end 22 of the top conveyor 14.

The conveyor station transfers the dough from the entry towards the intermediate point along an outward path through a station 24 for rolling up the rolled out dough delivered by the rolling out station 20 and then, after transferring them to a first end 26 of the bottom conveyor 16, along a return path from the intermediate point to the exit from the conveyor station, consisting of the opposite end 28 of the bottom conveyor 16 and located near the entry of the transfer station.

The rolling out station 20 comprises two associated rolling out rolls 30 and 32 facing an entry hopper 34 (not shown in FIG. 1) for feeding the shaping machine with dough.

The belt of the top and bottom conveyors 14 and 16 travels in the same direction represented by an arrow F in FIG. 2, the belt of the top conveyor 14 moving faster than that of the bottom conveyor 16.

The first conveyor 14 has a top active face 36 delimiting the outward path and cooperating with a fixed belt 38 which it forms the station 24 for rolling up dough. The belt 38 is, for example, a flexible plate made from an appropriate material for the intended use, for example of stainless steel wires. In conjunction with the-active top face 36 it rolls up the rolled out dough, in the conventional way.

The top conveyor 14 also has a bottom active face 40 extending parallel to the top active face 36 and moving in the opposite direction to the latter.

It cooperates with the top active face 42 of the bottom conveyor 16 to delimit the return path and constitute a station 44 for stretching the rolled up dough.

The active top face 42 of the bottom conveyor 16 is substantially parallel to the active bottom face 40 of the top conveyor 14 and moves in the opposite direction to it.

The two active faces 40 and 42 are slightly convergent and the distance between them at the intermediate point 22 is substantially the same as the diameter of the rolled up dough delivered at the exit from the rolling up station 24 while at the exit 28 from the transfer station the distance between them is the same as the required diameter of the dough.

As can be seen in FIGS. 1 and 2 the shaping machine includes a station 46 for transferring the rolled up dough from the outward path to the return path between the active bottom face 40 and the active top face 42 of the top and bottom conveyors 14 and 16 from the intermediate point 22 to the exit 28 to the conveyor station.

The transfer station 46 comprises a third conveyor belt downstream of the outward path and having an active surface 48 facing towards the intermediate path 22 and extending towards a gap 50 between the top and bottom conveyors 14 and 16.

The third conveyor 46 is driven by drive means 51 at a speed lower than that of the top conveyor 14 and greater than or equal to that of the bottom conveyor 16 so that the facing surfaces of the first and third conveyors move in opposite directions to rotate the rolled up dough and transfer it into the gap 50.

Figure 4:
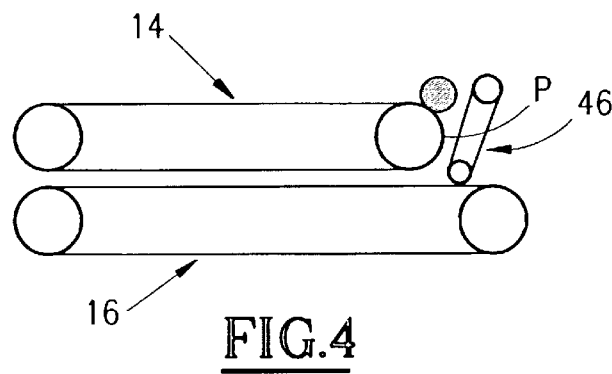
FIGS. 4 through 6 show the shaping machine from FIG. 2 in various phases of its operation.

In accordance with one particular feature of the invention the third conveyor 46 can be moved in translation on the frame 12 about a stable equilibrium position for receiving the rolled up dough, represented in FIGS. 2 and 4, in which the smallest distance between the facing surfaces of the first and third conveyors 14 and 46 is less than the diameter of the rolled up dough.

Figure 5:
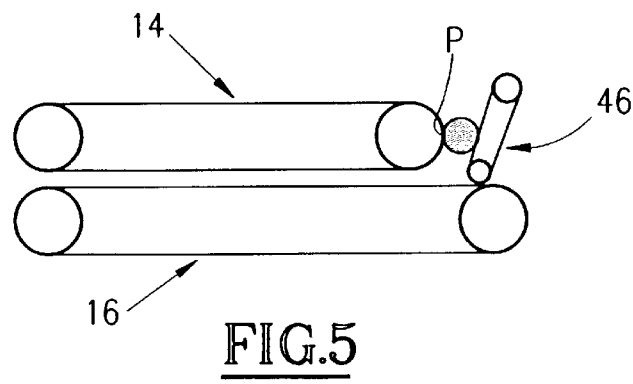
Figure 6:
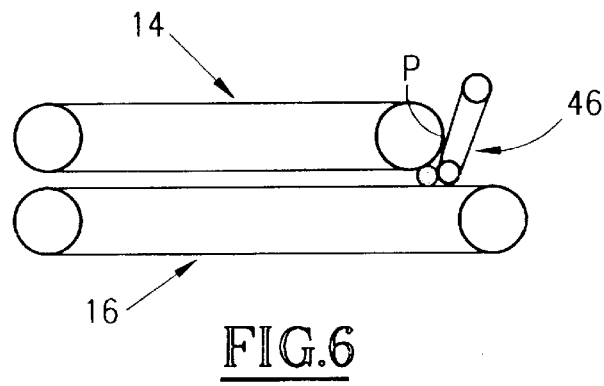

In particular, the third conveyor 46 is movable axially on the frame 12 between a retracted position shown in FIG. 5 enabling the rolled up dough to pass beyond the intermediate point 22 and an advanced position shown in FIG. 6 for pushing the dough between the first and second conveyors.

Figure 3:
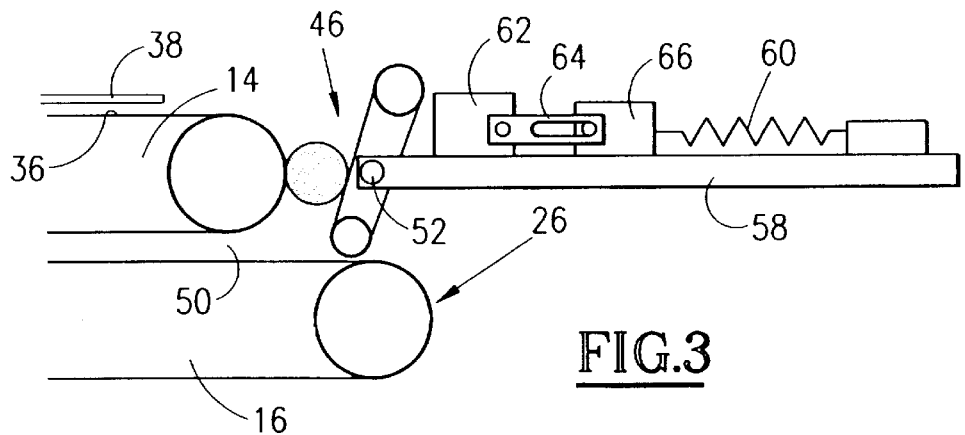
FIG. 3 represents an enlarged view of a detail of the shaping machine from FIG. 2 showing the means for fixing the third conveyor.

To this end, and as shown in FIGS. 1 and 3, the third conveyor 46 has one or more transverse shafts 52 equipped with rollers 54 at their opposite ends engaging in a complementary guide groove 56 of the conveyor 46.

As can be seen in FIG. 3, the transverse shaft 52 is coupled, for example by means of an optional longitudinal member 58, to a spring 60 connected to a fixed part 62 of the frame 12 by two parts 64 and 66 that slide relative to each other.

Thus the spring 60 urges the third conveyor 46 into the advanced position.

The guide grooves 56 for the conveyor 46 are slightly inclined so that their gentle slope urges it towards the retracted position.

In the equilibrium position, as shown in FIG. 3, the force applied by the spring 60 opposes movement of the third conveyor 46 under its own weight.

In accordance with another feature of the third conveyor 46, it has a belt formed of a set of associated belts extending parallel to the direction in which the dough moves, i.e. perpendicular to the longitudinal dimension of the dough.

These belts form annular imprints in the dough during its transfer, so significantly stretching the dough.

It would nevertheless be possible to replace these belts with a solid belt made from an appropriate flexible material.

Referring again to FIG. 2, it can be seen that the shaping machine is completed by a tank 68 for recovering the shaped dough mounted on the frame 12 and by drive means (not shown) for the first and second conveyors 14 and 16.

Note that the top conveyor 14 is fixed to a box section that is fixed relative to the frame 12 and that the second and third conveyors 16 and 46 are fixed to a common mobile box section that is adjustable in height (not shown) carried by the frame 12 so that the distance between the first and second conveyors can be adjusted in accordance with the required diameter of the dough.

Note also that the third conveyor 46 is mounted on the mobile box section in a manner such that its inclination can be adjusted according to the mass of dough to be shaped.

The operation of the shaping machine will now be described with reference to FIGS. 4 through 6.

The dough, inserted into the entry of the shaping machine by the hopper 34, passes through the rolling out station 20 and is delivered to the exit from this station at the entry of the conveyor station, i.e. onto the active top face 36 of the first conveyor 14.

The rolled out dough is then fed by the latter conveyor through the rolling up station 24 at the exit from which it is in the form of a cylinder, as shown in FIG. 4.

Note that in this position the third conveyor 46 of the shaping machine is in its stable equilibrium position.

The rolled up dough is then transferred from the outward path to the return path at the intermediate point 22 by the action of the third conveyor 46.

Thus when the dough reaches the active surface 48 of the third conveyor 46, it causes the conveyor to move from its equilibrium position towards its retracted position, against the action of the spring 60, to enable the dough to pass over the intermediate point P, because of the difference in the speed of rotation between the first and third conveyors (FIG. 5).

The third conveyor is then returned to its initial position by the spring 60 and pushes the dough between the first and second conveyors, because of its inertia and by means of the sliding of the parts 64 and 66 (FIG. 3).

The shaping machine is then in the position shown in FIG. 6.

The dough is then moved through the shaping station by the first conveyor 14 cooperating with the second conveyor 16 and in this station it is stretched by the active faces 40 and 42 and moved to the recovery tank 68.

The dough is clearly guided and rotated at all times during its transfer from the entry of the conveying station to its exit, shaping being effected regularly and homogeneously. A product of good quality is thereby obtained.

The movement in opposite directions of the first and second conveyors and the action of the third conveyor on the dough produce products of great length.

We claim:

1. A dough shaping machine comprising, mounted on a frame (12), a station (20) for rolling out dough and a station (14, 16) for conveying the rolled out dough along an outward path from the entry (18) of said conveyor station (14, 16) facing the rolling out station (20) to an intermediate point (P) through a station (24) for rolling up the rolled out dough and a return path through a station (44) for stretching the rolled up dough from said intermediate point (P) to the exit (28) from the conveyor station near said entry (18) and at which the shaped dough is delivered to the output of the shaping machine, characterized in that it further includes, in the vicinity of the intermediate point, a transfer station (46) with a mobile member actively transferring the rolled up dough from the outward path to the return path.

2. A shaping machine according to claim 1 characterized in that the conveyor station includes a first motorized transfer conveyor belt (14) with mutually opposed first and second active faces (36, 40) moving in opposite directions and a second motorized conveyor (16) having an active face (42) parallel to the second active face (40) of the first conveyor (14) and moving at a lower speed and in the opposite direction to the latter, said first active face (36) of the first conveyor (14) delimiting said outward path and said second active face (40) of the first conveyor (14) and said active face of the second conveyor conjointly assuring the shaping and the displacement of the rolled up dough along said return path.

3. A shaping machine according to claim 2 characterized in that the transfer station includes a third motorized conveyor belt (46) downstream of the outward path and including an active surface (48) facing towards the intermediate point (P) and extending towards a gap (50) between said first and second conveyors.

4. A shaping machine according to claim 3 characterized in that at the intermediate point (P) the active surface (48) of the third conveyor (46) and the facing surface of the first conveyor (14) are at a distance from each other less than or equal to the diameter of the rolled up dough and are moved in opposite directions to rotate the dough.

5. A shaping machine according to claim 3 characterized in that the third conveyor (46) is mobile in translation on the frame (12) parallel to the second conveyor (16) about a stable equilibrium position for receiving rolled up dough between a retracted position enabling dough to pass beyond the intermediate point (P) under the action of a force exerted by said dough in opposition to return means (60) urging said third conveyor towards the equilibrium position and an advanced position for pushing the dough between first and second conveyors (14, 16) by means of the inertia of said third conveyor (46).

6. A shaping machine according to claim 5 characterized in that the third conveyor (46) is equipped with rollers (54) engaging in inclined guides (56) to urge said third conveyor (46) towards the retracted position.

7. A shaping machine according to claim 3 characterized in that the belt of the third conveyor (46) is made up of a plurality of associated belts extending parallel to the direction of movement of the dough.

8. A shaping machine according to claim 3 characterized in that the third conveyor (46) is driven at a speed which is at least equal to that of the second conveyor (16) and less than that of the first conveyor (14).

9. A shaping machine according to claim 3 characterized in that said first and second conveyors (14, 16) are disposed horizontally and said third conveyor (46) is inclined to them.

10. A shaping machine according to claim 3 characterized in that said second and third conveyors (16, 46) are fixed to a common mobile box section carried by the frame (12) in an adjustable manner and said first conveyor (14) is mounted on a box-section fixed relative to said frame (12) so that the distance between said first and second conveyors can be adjusted.

11. A shaping machine according to claim 4 characterized in that the third conveyor (46) is mobile in translation on the frame (12) parallel to the second conveyor (16) about a stable equilibrium position for receiving rolled up dough between a retracted position enabling dough to pass beyond the intermediate point (P) under the action of a force exerted by said dough in opposition to return means (60) urging said third conveyor towards the equilibrium position and an advanced position for pushing the dough between first and second conveyors (14, 16) by means of the inertia of said third conveyor (46).

12. A shaping machine according to claim 4 characterized in that the belt of the third conveyor (46) is made up of a plurality of associated belts extending parallel to the direction of movement of the dough.

13. A shaping machine according to claim 5 characterized in that the belt of the third conveyor (46) is made up of a plurality of associated belts extending parallel to the direction of movement of the dough.

14. A shaping machine according to claim 6 characterized in that the belt of the third conveyor (46) is made up of a plurality of associated belts extending parallel to the direction of movement of the dough.

15. A shaping machine according to claim 4 characterized in that the third conveyor (46) is driven at a speed which is at least equal to that of the second conveyor (16) and less than that of the first conveyor (14).

16. A shaping machine according to claim 5 characterized in that the third conveyor (46) is driven at a speed which is at least equal to that of the second conveyor (16) and less than that of the first conveyor (14).

17. A shaping machine according to claim 6 characterized in that the third conveyor (46) is driven at a speed which is at least equal to that of the second conveyor (16) and less than that of the first conveyor (14).

18. A shaping machine according to claim 7 characterized in that the third conveyor (46) is driven at a speed which is at least equal to that of the second conveyor (16) and less than that of the first conveyor (14).

19. A shaping machine according to claim 4 characterized in that said first and second conveyors (14, 16) are disposed horizontally and said third conveyor (46) is inclined to them.

20. A shaping machine according to claim 5 characterized in that said first and second conveyors (14, 16) are disposed horizontally and said third conveyor (46) is inclined to them.

21. A shaping machine according to claim 6 characterized in that said first and second conveyors (14, 16) are disposed horizontally and said third conveyor (46) is inclined to them.

22. A shaping machine according to claim 7 characterized in that said first and second conveyors (14, 16) are disposed horizontally and said third conveyor (46) is inclined to them.

23. A shaping machine according to claim 8 characterized in that said first and second conveyors (14, 16) are disposed horizontally and said third conveyor (46) is inclined to them.

24. A shaping machine according to claim 4 characterized in that said second and third (16, 46) are fixed to a common mobile box section carried by the frame (12) in an adjustable manner and said first conveyor (14) is mounted on a box-section fixed relative to said frame (12) so that the distance between said first and second conveyors can be adjusted.

25. A shaping machine according to claim 5 characterized in that said second and third (16, 46) are fixed to a common mobile box section carried by the frame (12) in an adjustable manner and said first conveyor (14) is mounted on a box-section fixed relative to said frame (12) so that the distance between said first and second conveyors can be adjusted.

26. A shaping machine according to claim 6 characterized in that said second and third (16, 46) are fixed to a common mobile box section carried by the frame (12) in an adjustable manner and said first conveyor (14) is mounted on a box-section fixed relative to said frame (12) so that the distance between said first and second conveyors can be adjusted.

27. A shaping machine according to claim 7 characterized in that said second and third (16, 46) are fixed to a common mobile box section carried by the frame (12) in an adjustable manner and said first conveyor (14) is mounted on a box-section fixed relative to said frame (12) so that the distance between said first and second conveyors can be adjusted.

28. A shaping machine according to claim 8 characterized in that said second and third (16, 46) are fixed to a common mobile box section carried by the frame (12) in an adjustable manner and said first conveyor (14) is mounted on a box-section fixed relative to said frame (12) so that the distance between said first and second conveyors can be adjusted.

29. A shaping machine according to claim 9 characterized in that said second and third (16, 46) are fixed to a common mobile box section carried by the frame (12) in an adjustable manner and said first conveyor (14) is mounted on a box-section fixed relative to said frame (12) so that the distance between said first and second conveyors can be adjusted.

* * * * *